United States Patent Office 3,375,101
Patented Mar. 26, 1968

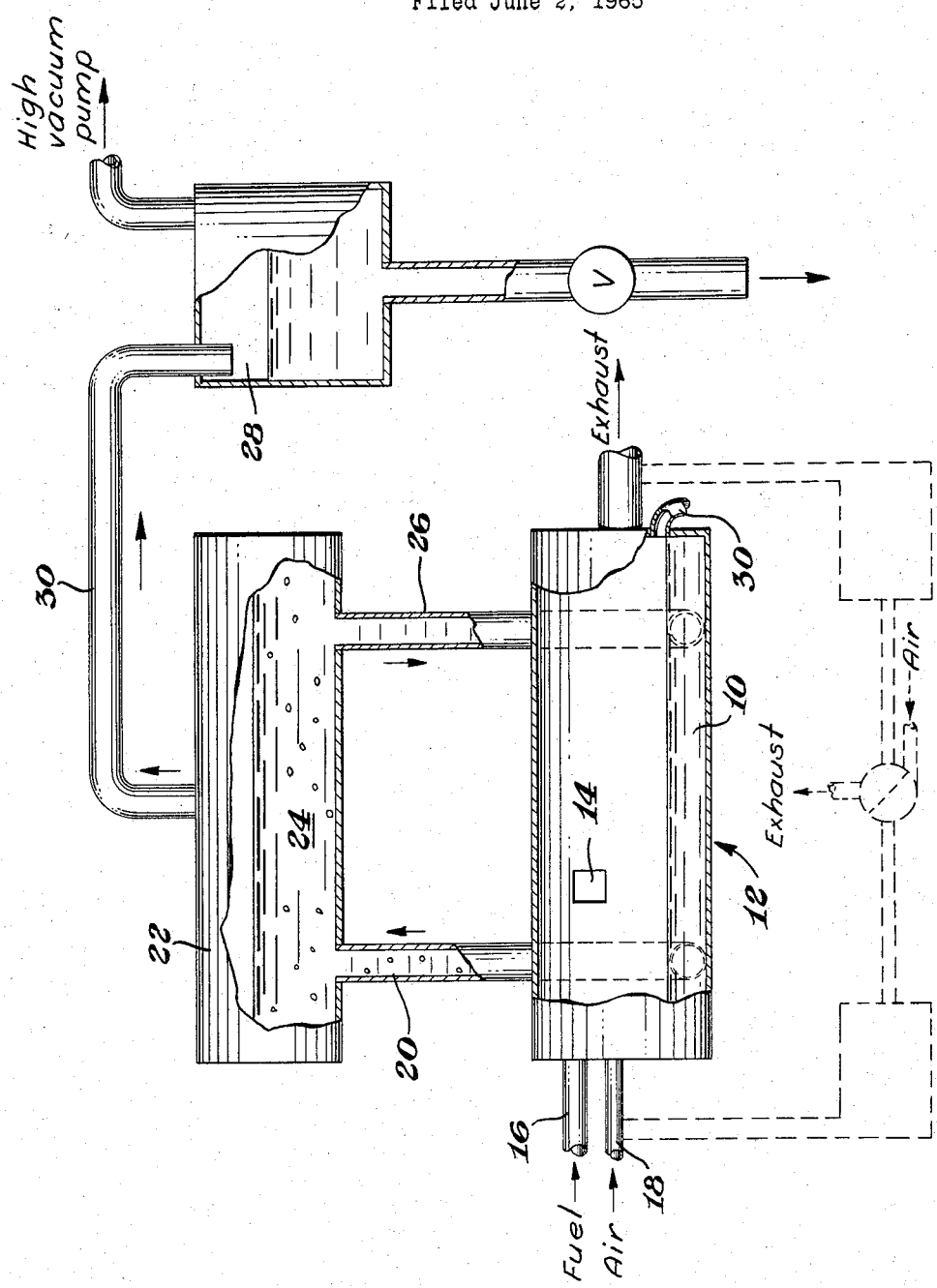

3,375,101
PREPARATION OF MAGNESIUM
Thomas W. Mulcihy, Jr., Freeport Tex., assignor to The Dow Chemical Company, Midland, Mich., a corporation of Delaware
Filed June 2, 1965, Ser. No. 460,696
4 Claims. (Cl. 75—67)

This invention relates to the metallothermic preparation of metals and more particularly is concerned with a novel process for the preparation of magnesium by metallothermic reduction of a magnesium source material employing an elevated reduced pressure reaction chamber connected to a heat source by barometric legs.

It is a principal object of the present invention to provide a novel process for the continuous thermal reduction preparation of magnesium and other volatile metals without the need for electric power resistance heating as a heat source.

It is another object of the present invention to provide a continuous metallothermic reduction process for producing magnesium wherein the operation can be continuous for extended periods of time without requiring periodic shut down for removal of slag from the reactors as must be done in the batch, semi-batch or so-called "continuous" operations of the known art.

These and other objects and advantages will be readily understood from the detailed description presented hereinafter when read in conjunction with the accompanying drawing.

The drawing is a schematic flow diagram of one embodiment of the present process.

In general, the present novel process comprises providing in a furnace or other heating apparatus at atmospheric pressure a molten slag material resulting from the reaction of a reducing agent and a metallothermically reducible volatile metal source material. To this molten slag is added additional quantities of the reducing agent and metallothermically reducible reactant, ordinarily at atmospheric pressure. The resulting fluid mixture is heated and raised by thermal syphon effect, ordinarily by means of a conduit, to an elevated reaction chamber having a low pressure maintained above the surface of the fluid reaction mixture therein, a second conduit providing for return of reaction by-product slag to the heating apparatus.

The fluid mixture is maintained in the reaction chamber at a temperature at which metallothermic reduction to the volatile metal takes place and wherein the volatile product metal is in the vapor state.

The low pressure reaction chamber is connected to a pressure reducing source, such as a high vacuum pump, to provide a low absolute pressure in the reactor above the melt. The low pressure is maintained only above the melt (and not in the charging furnace or heating apparatus) by the presence of the molten mass in the barometric legs of the conduits. Removal of the volatile product metal as vapor from the fluid reaction mixture and out of the reaction chamber readily is achieved by the low pressure above the reaction mixture.

Spent slag readily is removed in a controlled manner from the heating apparatus by overflow means or other fluid-handling apparatus. Removal of the excess slag does not require breaking of the low pressure in the reactor chamber. This assures continuous operation which cannot be achieved in art practiced processes.

In a preferred embodiment of the present invention, magnesium is produced by reaction of a magnesium containing source material, i.e. an ore or mineral, with aluminum, ferrosilicon or a mixture of these reducing agents. In one specific embodiment of this preferred process, a slag 10 resulting from the reaction of aluminum and calcined dolomite is maintained in a molten state in an open hearth furnace 12. Additional calcined dolomite and aluminum reactants are introduced at atmospheric pressure into the slag in the furnace through port 14, the amounts of the dolomite and aluminum ordinarily being about stoichiometric of that required to reduce all of the magnesium oxide in the dolomite reactant to magnesium. Fuel and air are introduced in the open hearth furnace 12 through feed means 16 and 18 respectively and burned in the furnace 12 above the liquid bed to maintain the slag 10 in the molten state and promote production of magnesium by the metallothermic reaction. The resulting natural bubbling action of the product magnesium vapors produced by the metallothermic reaction along with convection currents within the fluid mass of the molten slag 10 and aluminum-dolomite reaction mixture carries the fluid mass by means of a thermal syphon effect through a conduit 20 from the bottom of the furnace 12 to an elevated reaction chamber 22 above the open hearth furnace 12, the reaction chamber 22 being maintained at a low absolute pressure. The pressure above the surface of the reaction mass 24 in this chamber 22 is maintained at a maximum of about 30 millimeters mercury absolute. Sufficient heat energy is added to the slag and reactants while in the furnace to assure that the temperature of the fluid mass, i.e. slag, reactants and magnesium product, in the reaction chamber ranges from about 1300° C. to about 1600° C. or higher while in this chamber.

A second conduit 26 spaced apart (preferably at the opposite end of the reactor) from the first conduit 20 also connects the reaction chamber 22 and the furnace 12 completing a circuit and providing for the circulation of the magnesium depleted molten slag mass 10 back to the open hearth furnace 12.

The total amount of the fluid mass maintained in the system is such that at all times the upper surface of the molten layer in the low pressure reaction chamber 22 is above the openings of the conduits communicating therewith, thus assuring a continuous seal between the atmospheric pressure of open hearth furnace 12 and the low absolute pressure atmosphere above the reaction mass 24 by the fluid masses in the barometric legs.

As magnesium is produced in the system it is withdrawn in the vapor state from the reaction chamber 22 towards a condenser 28 by means of the high vacuum line 30. The magnesium itself adds to the absolute low pressure present in the reaction chamber by reacting with any nitrogen, water vapor and oxygen that might be present in the low pressure system.

The resulting magnesium product ordinarily is condensed into the liquid state in the condenser 28 and can be cast directly or otherwise handled and processed using conventional magnesium metal handling techniques.

Spent slag 10 readily is controllably removed from the open hearth furnace 12 by means of a simple overflow 30. This provides for easy maintenance of a controlled volume of material in the system and does not require breaking or loss of the reduced pressure in the reactor chamber. Continuous operation, therefore, can be carried out for extended periods of time without need for shut down for slag removal or other operations.

Ordinarily, in the production of magnesium the reduced pressure in the reaction chamber 22 at a maximum is about 30 millimeters mercury absolute and the reaction temperature is maintained at from about 1300° C. to about 1600° C. Preferably, the absolute pressure ranges from about 300 to about 500 microns mercury absolute and the reaction temperature is maintained at from about 1400 to about 1500° C.

Amounts of reducing agent utilized in the present process range from about 80 to about 100 percent of that theoretically required for reducing the metallothermically reducible reactant material. Preferably the reducing agents are employed in slightly less than stoichiometric quantities based on complete reduction of the reducible material to the volatile metal product.

The reactants may be fed into the atmospheric pressure chamber, i.e. into the open hearth furnace 12, either in the solid or liquid form. Further, it is not necessary that the reactants both be in the same physical form. To illustrate: A magnesium ore material may be introduced as a solid particulate mass while aluminum can be added in the liquid state.

A highly suitable reactant source results from the mixing together and pelletizing of the ore material and finely divided metallic reductant in a predetermined ratio. This method of reactant preparation provides both for assuring that the reactants are present in the desired concentrations and that there is close contact between the reductant and the ore or other metal source material used. Additionally, this gives easy and controlled addition of the reactants into the system.

Fuels generally employed in the heating operation are hydrocarbon gases, oils and coals such as generally are employed in ordinary furnace operation.

Although it is preferred to introduce the reactants directly into the slag at atmospheric pressure, as in the open hearth furnace, if desired the reactants can be added directly into the liquid mass low pressure reaction zone through use of interlocks or other entry-port systems such that the low pressure in the reaction vessel is maintained.

If desired, as shown by dotted lines in the figure, alternatively the exhaust gaseous combustion products can be used to preheat fresh intake air, which is then fed back into the furnace for combustion with fuel. This regenerative operation serves to further increase efficiency of operation.

A prime advantage of the present novel process is that it is not necessary to use complex, complicated and expensive electrical resistance heating to accomplish the metallothermic reduction. Rather, the sensible heat contained in the molten slag is used to effect the reduction. Additionally, transport of the product metal and/or metal reactant mixture to the low pressure chamber is achieved within the circulating fluid mass.

Magnesium containing minerals and ores which have been found to be satisfactory for use in the present process are calcined magnesite, calcined brucite, calcined magnesium hydrate, dolomite, mixtures of these materials, olivine ($2MgO \cdot SiO_2$) and the like.

Aluminum, aluminum carbide, ferrosilicon, aluminum silicide, calcium carbide, calcium, and mixtures of these materials ordinarily are employed as the reductant in the production of magnesium.

Furnace, metal transport, reaction chamber, material holding vessels and the like for use in the present process are to be constructed from those materials and of a design such that the equipment is not detrimentally attacked by the reaction mixture by-product slag or volatile metal product. Further, these must be of such a design and fabrication to withstand the elevated temperatures and reduced pressures of operation.

Although the present process has been shown as being operable for magnesium, it is understood that other volatile metals such as calcium, for example, which can undergo metallothermic reduction also can be satisfactorily produced in accordance with the present invention.

Various modifications can be made in the present invention without departing from the spirit or scope thereof for it is understood that I limit myself only as defined in the appended claims.

I claim:

1. A process for preparing a volatile metal which comprises:
    (a) providing at about atmospheric pressure a molten slag material, said slag material produced by the reaction of a reducing agent and a metallothermically reducible volatile metal source material,
    (b) adding to said molten slag quantities of said reducing agent and a metallothermically reducible volatile metal source material,
    (c) raising the resulting fluid mixture of said slag to an elevated reaction chamber and providing a layer of said fluid mixture in said reaction chamber while maintaining the fluid mass at a temperature at which metallothermic reduction to the volatile metal takes place and wherein the volatile metal is in the vapor state and providing a low absolute pressure in said elevated reaction chamber above the surface of said layer,
    (d) removing volatile product metal as vapor from the fluid mass and from the reaction chamber by the low pressure maintained above said layer of fluid mixture,
    (e) returning the co-produced molten slag material to said heating apparatus, and
    (f) removing said slag in a controlled manner from said heating apparatus without breaking the low pressure in the reaction chamber.

2. A process for the metallothermic preparation of magnesium which comprises;
    (a) adding in an open hearth furnace at about atmospheric pressure a magnesium containing source material and a reducing agent selected from the group consisting of aluminum, aluminum carbide, ferrosilicon, aluminum silicide, calcium carbide, calcium or mixtures thereof to a molten slag resulting from the reaction of said magnesium containing source material and said reducing agent, the amount of said reducing agent being from about 80 to 100 percent of that theoretically required to reduce to magnesium the magnesium values present in the magnesium containing source matreial,
    (b) transferring the resulting fluid mass of said molten slag and magnesium producing reaction mixture by means of a first conduit from said furnace to an elevated reaction chamber above said furnace, said reaction chamber containing a layer of said fluid mass the surface of which is above the opening of said first conduit into said reaction vessel,
    (c) maintaining in said reaction chamber the atmosphere above the surface of said fluid mass at a maximum pressure of about 30 millimeters mercury absolute and the temperature of the fluid mass within the range of from about 1300 to about 1600° C.,
    (d) withdrawing magnesium in the vapor state from the fluid mass and removing the magnesium vapors from the reaction chamber and condensing said magnesium vapors,
    (e) transporting the residual molten slag containing reaction mass to said open hearth furnace by means of a second conduit spaced apart from said first conduit, the opening of said second conduit being below the surface of the fluid mass in said reaction chamber, and
    (f) controllably removing said molten slag from said open hearth furnace thereby providing a controlled volume of material in the system without breaking the reduced pressure in said reaction chamber.

3. The process defined in claim 2 wherein the magnesium containing source material is calcined dolomite and the reducing agent is aluminum.

4. The process as defined in claim 2 wherein the absolute pressure in the reaction chamber is maintained at from about 300 to about 500 microns mercury absolute and the temperature of the fluid mass in said reaction chamber is maintained at from about 1400 to about 1500° C.

(References on following page)

References Cited

UNITED STATES PATENTS

| | | | |
|---|---|---|---|
| 2,240,584 | 5/1941 | Suchy et al. | 75—67 |
| 2,396,658 | 3/1946 | Hybinette et al. | 75—67 |
| 2,402,193 | 6/1946 | Willmore | 75—67 |
| 2,956,871 | 10/1960 | Curnow et al. | 75—88 X |
| 3,215,423 | 11/1965 | Taylor | 75—49 X |

FOREIGN PATENTS 645,985  7/1962  Canada.

DAVID L. RECK, *Primary Examiner.*

H. W. TARRING, *Assistant Examiner.*